June 26, 1934.  A. STUCKI  1,964,543
SIDE BEARING
Filed Jan. 12, 1933
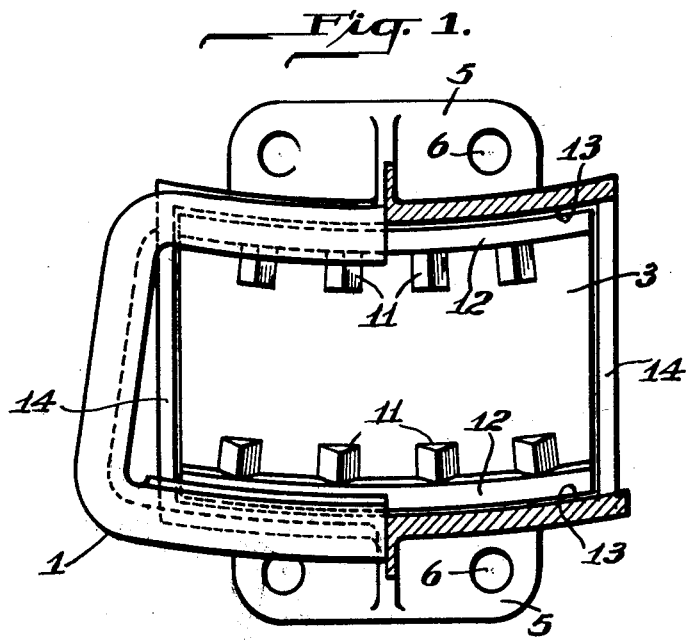
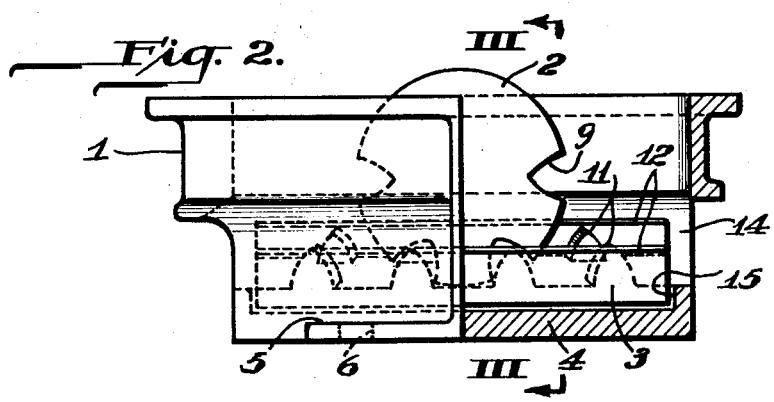
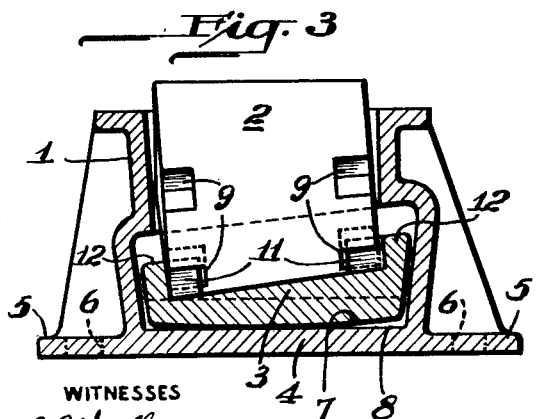
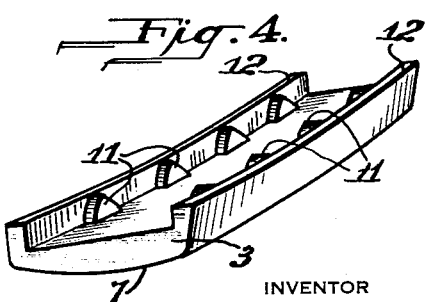
INVENTOR
Arnold Stucki
by Brown Critchlow & Flick
his Attorneys
WITNESSES
A B Wallace
J E Dickinson Patented June 26, 1934

1,964,543

UNITED STATES PATENT OFFICE 1,964,543

SIDE BEARING

Arnold Stucki, Pittsburgh, Pa.

Application January 12, 1933, Serial No. 651,299

3 Claims. (Cl. 308—226)

This invention relates to side bearings for railway cars and has for its primary object the provision of a roller type frictionless bearing of this character, which is efficient and lasting in service, simple and relatively inexpensive to manufacture and maintain, and easy to install and inspect.

A more particular object is to provide a novel and improved form of roller seat for a bearing of this character which is adapted to maintain the anti-friction roller in proper contact over its entire length with the bearing surface of the upper bolster when it engages such bolster and irrespective of whether irregularities occur in such surface or not, and while not necessarily so limited is intended more especially for use in connection with side bearings provided with a roller which is adapted to travel in a radial path and to automatically return to the center of the bearing whenever the upper bolster lifts away from it.

These and numerous other objects, as well as the various other novel features and advantages of the invention, will be apparent when the following detailed description is read in conjunction with the accompanying drawing, of which Fig. 1 is a view partly in plan and partly in section of a side bearing constructed in accordance with the invention, showing it with the anti-friction roller removed; Fig. 2 a view partly in elevation and partly in section of the same bearing, with the anti-friction roller in place; Fig. 3 a section taken on the line III—III of Fig. 2; and Fig. 4 a perspective view of the self-adjusting roller seat.

Referring in detail to the embodiment of the invention illustrated by the drawing, the numeral 1 designates the cage or housing of the bearing and the numeral 2 the antifriction roller which is housed in this cage, while the numeral 3 designates a self-adjusting seat for this roller which constitutes the principal feature of the invention, as will presently appear.

To adapt the cage 1 for use on a straight bolster its lower face 4 is made flat, although as will be readily appreciated it may be modified to fit most any form of bolster, while for fastening it to the bolster it is provided with a pair of laterally disposed flanges 5 in which a plurality of holes 6 are formed to receive the rivets or bolts used to secure it to the truck bolster.

In order to prevent the roller 2 from becoming dislodged from the cage the side and end walls thereof are made to extend well above the center of the roller and to adapt it for long travel operation it is made in the shape of an arc, the center of curvature of which is the center of the bolster on which it revolves. With such a cage the roller 2 is tapered to form the frustrum of a cone, the apex of which is the center of the bolster or king pin of the car truck, and to resist the pounding action of the bolster, which is usually considerable and also give the bearing an adequate bearing surface as well as more than a mere line contact, the roller is made with the necessary length and diameter, while to place the upper surface of the roller 2 in the plane of the bearing surface of the upper bolster which it contacts, a seat 3 is provided in the bottom of the cage 1 which is tapered towards the inner wall of the cage or in the opposite direction to the top of the roller and inclined sufficiently to provide the desired result.

In accordance with the invention to adapt the roller 2 to automatically adjust itself so that it will at all times bear evenly over its entire length against the bearing surface of the upper bolster when engaged thereby, the bottom 7 of the seat 3 is curved in the manner of a rocker of spherical contour and mounted on a flat smooth surface 8 forming the bottom of the roller cage 1. Hence, irrespective of whether the bearing surface of the upper bolster becomes worn or disaligned due to strains in service, the roller will operate with the maximum bearing contact at all times, thereby both increasing its length of life and improving its operation.

In such bearings, as is well known, it is desirable to have the roller automatically return to the center of the bearing cage whenever the upper bolster lifts away from it. To provide for this, as the roller does not move more than a part of a revolution each time it operates, it may be provided with a cavity or two in its upper half, as shown in U. S. Patent No. 1,135,413, granted to A. Stucki in 1915, or its lower half may be provided with such a cavity or cavities and these filled with lead or some similar material which is heavier than the body of the roller, to place the center of gravity of the roller below its real center and thereby cause it to automatically seek the center of the cage whenever it is free to do so.

It is also desirable to provide means for preventing the roller from shifting relatively to its proper working position on the bearing surface of the roller seat so that it can not become displaced by heavy end shocks or sudden longitudinal blows on the car. To provide for this a series of uniformly spaced notches or recesses 9 is formed in the bottom portion of the roller at its ends and adapted to receive a series of cooperating teeth 11 which are provided along the sides of the roller seat 3. These teeth are supported at their outer ends by flanges 12 formed on the sides of the roller seat and the notches and teeth are provided in sufficient numbers, and so spaced as to provide for the necessary roller travel.

For receiving the flanges 12, which form the sides of the roller seat 2, and assist in holding the seat in place, the side walls of the bearing housing are offset, as illustrated, adjacent the bottom thereof, to provide pockets 13 in which the ends of the seat fit. And to facilitate the assembling of the bearing and at the same time provide an opening for the dirt which collects in the bearing to escape, openings 14 are formed in the ends of the cage. These are preferably made sufficiently deep and long to readily permit the seat 3 to be passed through them and located sufficiently above the bottom of the cage to provide stops 15 for engaging the ends of the seat 3 and preventing it from jumping out of the cage.

In operation, as will be appreciated from the foregoing description, the roller is permitted to roll with freedom on the bearing surfaces with its contacts, and by reason of the rocking form of roller seat employed it is adapted to automatically maintain itself in surface-to-surface contact with the bearing surface of the upper bolster when it contacts with such surface. Consequently, it travels with the greatest facility with the swivelling of the truck, and as it constantly maintains itself in complete contact with the upper bolster its life is greatly enhanced. Furthermore, the interengaging teeth and notches of the roller seat and roller prevent the roller from slipping on the bearing surface, and from being shifted out of normal position by end shocks of the car. In addition the simple and novel construction of the cage insures the parts of the bearing being maintained in position while at the same time permits their being easily assembled and inspected.

It will be readily appreciated by those skilled in the art that while in the drawing and description the invention has been limited to a single embodiment it may be modified in various ways and applied to various types of bearings and kinds of bolster and such is contemplated by the appended claims.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A side bearing for railway cars, comprising a cage provided with end and side walls, the end walls having openings therein, a self-adjusting roller seat having a rounded bottom and flanged side edges mounted in said cage, a roller provided with spaced notches on its periphery at its ends mounted for movement on said seat, a series of spaced teeth disposed along the edges of said seat to engage in the notches in said roller and offsets in said side walls for receiving the flanged edges of said seat, the openings in said end walls being adapted to permit the roller seat to be slid into the cage from the end and disposed sufficiently above the bottom of the cage so that the portion of the end wall therebelow will engage the end of said seat.

2. A side bearing for railway cars comprising a cage adapted to be attached to a car bolster provided with a bottom and side walls, said walls having in them offsets or grooves adjacent said bottom, a self-adjusting bearing seat mounted in said cage with its side edges disposed within said grooves, a roller mounted in said cage to ride upon said seat, and an end in said cage having an opening therein which is adapted to permit the seat to be slid into said grooves and provided with means to prevent said seat from becoming dislodged when assembled.

3. A side bearing for railway cars comprising an open-top substantially box-shaped cage adapted to be attached to a car bolster having offsets in its side walls running along their length adjacent their lower edges and an opening in one of its end walls opposite said offsets but above the lower wall of the cage, a self-adjusting roller seat mounted in said cage with its side edges disposed in said offsets and a roller mounted upon said seat, said opening in the end wall of the cage being adapted to permit said seat to be slid into the offsets in the side walls and the portion of the end wall below the opening being adapted to hold the seat in place when assembled.

ARNOLD STUCKI.